United States Patent [19]
Caddock, Jr.

[11] Patent Number: 5,361,300
[45] Date of Patent: Nov. 1, 1994

[54] BALANCING RESISTOR AND THERMISTOR NETWORK FOR TELEPHONE CIRCUITS, AND COMBINATION THEREOF WITH RELAY

[75] Inventor: Richard E. Caddock, Jr., Winchester, Oreg.

[73] Assignee: Caddock Electronics, Inc., Riverside, Calif.

[21] Appl. No.: 37,927

[22] Filed: Mar. 26, 1993

Related U.S. Application Data

[63] Continuation-in-part of Ser. No. 5,589, Jan. 19, 1993, abandoned.

[51] Int. Cl.$^5$ .............................................. H01C 1/12
[52] U.S. Cl. .................................. 379/412; 379/398; 379/399; 379/400; 338/308; 338/309
[58] Field of Search ............... 379/398, 399, 400, 402, 379/403, 404, 412; 338/20, 21, 22 R, 307, 308, 309, 314; 361/119, 105, 406; 337/297, 116, 232

[56] References Cited

U.S. PATENT DOCUMENTS

| 3,778,744 | 12/1973 | Brandi | 338/314 |
|---|---|---|---|
| 3,978,443 | 8/1976 | Dennis et al. | 338/309 |
| 4,297,670 | 10/1981 | Solow | 338/308 |
| 4,467,310 | 8/1984 | Jakab | 338/308 |
| 4,528,546 | 7/1985 | Paoli | 338/309 |
| 4,630,025 | 12/1986 | Bourolleau | 338/309 |
| 4,809,324 | 2/1989 | Bender | 379/412 |
| 4,939,498 | 7/1990 | Yamada et al. | 338/22 R |
| 4,959,751 | 9/1990 | Hearn et al. | 361/406 |
| 4,961,065 | 10/1990 | Taylor | 338/308 |
| 5,204,799 | 4/1993 | Stibila | 338/309 |
| 5,254,969 | 10/1993 | Caddock, Jr. | 338/308 |

FOREIGN PATENT DOCUMENTS

| 0395231 | 4/1990 | European Pat. Off. | H01H 85/046 |
|---|---|---|---|
| 2109760 | 9/1971 | Germany | H01H 85/06 |
| 3245629 | 12/1982 | Germany | H01H 85/14 |
| 2163307 | 8/1994 | United Kingdom | H01H 85/14 |

OTHER PUBLICATIONS

Disclosure of IRC (formerly TRW) discrete wirewound resistor (Sheet 1).
Specification sheet for IRC discrete wirewound resistor (Sheet 1a).
Disclosure of Ericsson resistor pair (Sheet 2).
Specification sheet for Ericsson resistor pair (Sheets 2a, two pages).

(List continued on next page.)

*Primary Examiner*—James L. Dwyer
*Assistant Examiner*—M. N. Shehata
*Attorney, Agent, or Firm*—Richard L. Gausewitz

[57] ABSTRACT

A balancing resistor and thermistor network for telephone circuits, and combination with an external relay, which reliably handles all three levels of adverse conditions, automatically resets under certain conditions, is physically small in size, and is strong. It is a flat ceramic substrate on both surfaces of which are screen-printed thick-film balancing resistor films. Also screen-printed on both surfaces are termination traces having portions so located that when the substrate substantially instantaneously fractures it reliably and substantially instantaneously breaks the circuits through the resistive films, the fracture occurring in response to a sudden high-voltage overload. Accordingly, there is no damage to, or melting or burning of, small wires in the telephone circuits at points near to or remote from the balancing resistor network. A thermistor film is screen-printed directly onto the substrate at a central region where there is no resistive film. The thermistor is connected to a relay and its associated circuitry on the telephone line card (circuit board), acting as a sensor to control the relay so that the latter resettably interrupts current flow through the entire circuit board and thus through the balancing resistor network.

12 Claims, 3 Drawing Sheets

OTHER PUBLICATIONS

Disclosure of Caddock Model 1789-16 (Sheet 3).
Specification sheet for Caddock Model 1789-16 (Sheet 3a), (same as Sheet 7a).
Disclosure sheet for Caddock Model 1789-22 (Sheet 4).
Specification sheet for Caddock Model 1789-22 (Sheet 4a).
Disclosure for Caddock Model 1789-15 (Sheet 5).
Specification sheet for Caddock Model 1789-15 (Sheet 5a).
Disclosure for Raychem two-side resistor (Sheets 6, two pages).
Disclosure for Caddock Model 1789-16 (Sheet 7).
Specification sheet for Caddock Model 1789-16 (Sheet 7a), (same as Sheet 3a).
Disclosure for Caddock Model 1789-22-2 (Sheet 8).
Specification sheet for Caddock Model 1789-22-2 (Sheet 8a).
Disclosure for Caddock Model 1789-53 (Sheet 9).
Specification sheets for Caddock Model 1789-53 (Sheets 9a, two pages).
Disclosure for Raychem PTC switch (Sheet 10).
Specification sheet for Raychem PTC switch (Sheet 10a).
Disclosure for Caddock Model LC2021-100-10-1.25 (Sheet 11).
Specification sheets for Caddock Model LC2021-10-0-10-1.25 (Sheets 11a, two pages).
Disclosure of Philips Components thermistor resistor (Sheet 12).

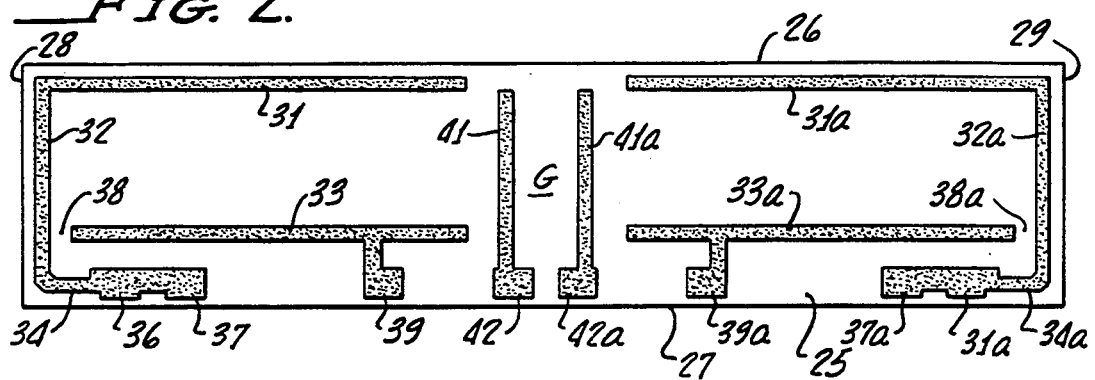
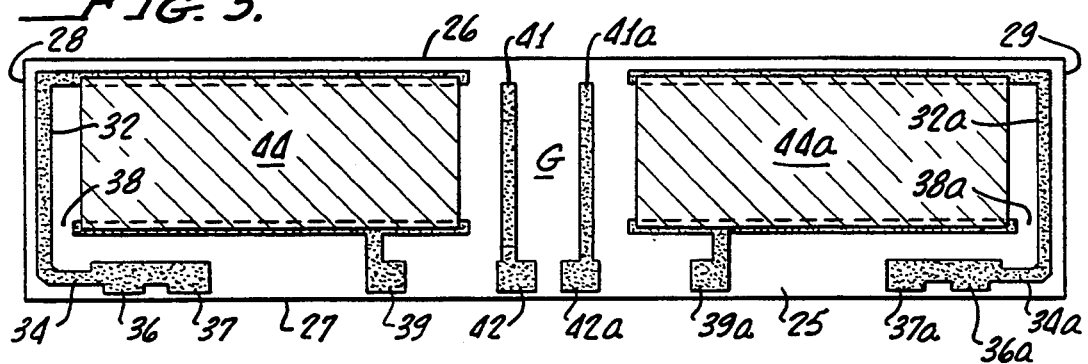
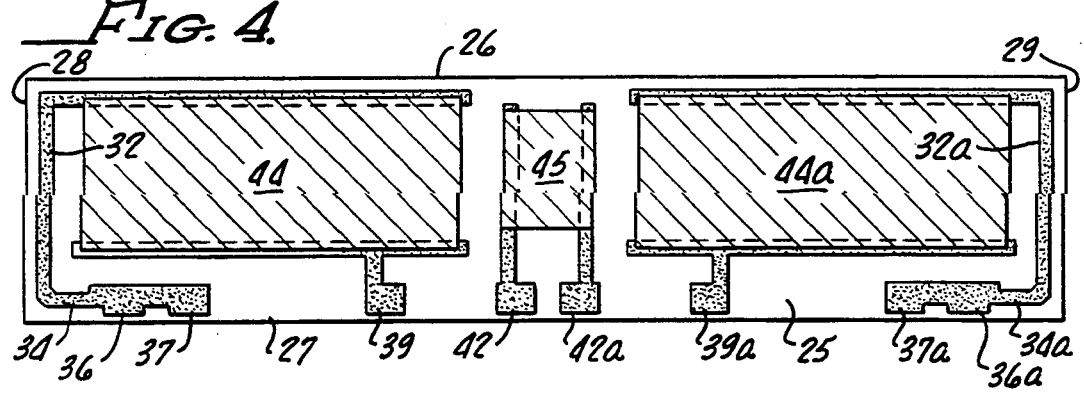
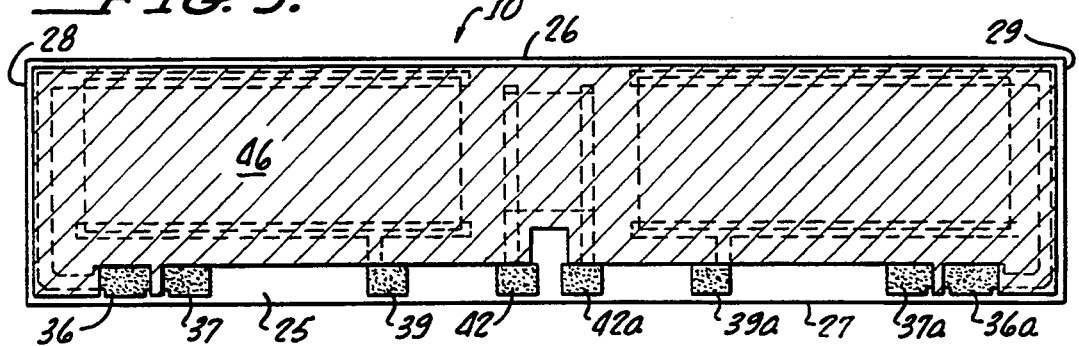

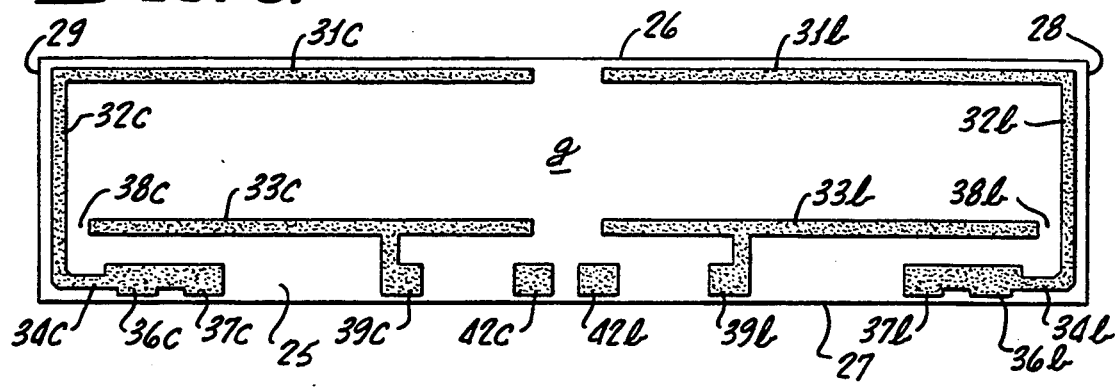
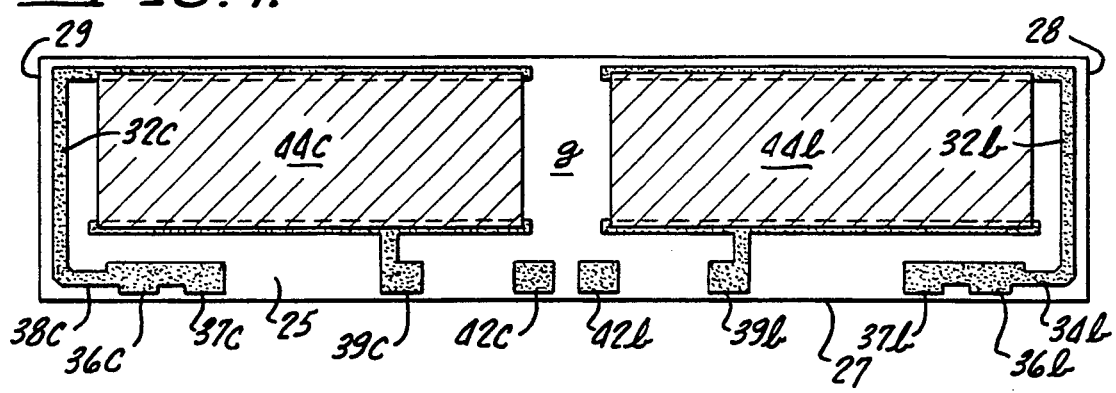
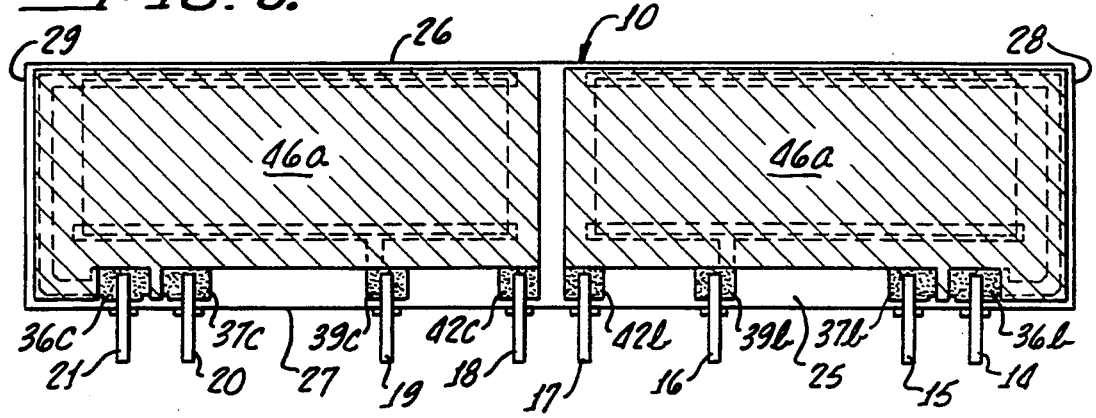

BALANCING RESISTOR AND THERMISTOR NETWORK FOR TELEPHONE CIRCUITS, AND COMBINATION THEREOF WITH RELAY

CROSS-REFERENCE TO RELATED APPLICATION

This is a continuation-in-part of application Ser. No. 08/005,589, filed Jan. 19, 1993 now abandoned, for Balancing Resistor and Thermistor Network for Telephone Circuits, and Combination Thereof with Relay, inventor Richard E. Caddock, Jr.

BACKGROUND OF THE INVENTION

It is essential in telephone line-interface circuits that the balancing resistors (telephone line interface resistors), in combination with the line cards (circuit boards), meet three levels of adverse conditions. Such levels are required by telephone companies of their suppliers of telephone switching equipment which uses these balancing resistors on line cards.

A first-level condition is one where the resistors and the line card survive and continue to function despite certain occurrences (conditions). These occurrences include lightning transients, and also include some types of improper connections such as could be made by technicians.

A second-level condition is one where, if there is no protection in the design, the balancing resistors overheat, the overheating being so significant as to cause melting and/or burning of resin-cased components on the line card, and/or cause burning of the line card (circuit board). Occurrences that give rise to a second-level condition are other types of improper connections which could be made by technicians.

A third-level condition is one where a sudden high-voltage surge is applied to the telephone system. Typically, an occurrence creating a third-level condition, if there is no protection in the design, is where power lines fall on or otherwise contact telephone wires in the system. Third-level conditions are often such as to melt small wires that are in the telephone system not only in the cages for the line cards, but also in regions outside of and remote from such cages. The small wires may not only melt or be otherwise damaged, but may burn and/or may cause a fire in the premises where the wires are located.

It is important for the telephone companies to have balancing resistors that meet and provide protection as necessary for the three levels of adverse conditions.

It is not enough that some of the balancing resistors in a production run, in combination with the line cards on which they are mounted, meet the three levels of adverse conditions. They must meet these levels reliably. Thus, if only some of the resistors meet the levels, that will not suffice; substantially all of the resistors must meet them or there is no reliability.

To summarize, therefore, not only must the balancing resistors perform the electrical functions that are required by telephone companies; they must reliably meet the three levels. That, however, is not all that the balancing resistors must do if their manufacturer is to survive and prosper in the balancing resistor business.

For example, it is often demanded that balancing resistors have low resistance values. Low-value resistors are vastly more susceptible to overheating than are high-value ones, simply because of the laws of physics. As another example, it is more and more demanded that balancing resistors be physically small in size, but such small-size resistors radiate less heat and thus are far more likely to fail heating tests. As a third example, some telephone companies want—at least for some applications—the balancing resistors and associated line cards to reset automatically after having open-circuited in response to an incipient second-level condition. In other words, they want everything to resume operating, after a second-level condition, just as if that condition had never happened, and without any need for human intervention.

SUMMARY OF THE INVENTION

A balancing resistor network for telephone circuits comprises a small, thin, brittle substrate having parallel surfaces on opposite sides thereof, which surfaces are quite close to each other. Thick-film resistive films are screen-printed onto both such surfaces. On one such surface, the resistive films are spaced a substantial distance from each other so as to form a large gap. A thermistor film is screen-printed onto such one surface, in such gap. The thermistor film is sufficiently far from the resistive films on the same surface that there is no significant arcing between the thermistor and the resistive films even when a third-level adverse condition occurs. On the other hand, the thermistor film is sufficiently close to the resistive films, on both substrate surfaces, that heat conducted through the substrate from the resistive films causes the thermistor to operate an associated relay before a second-level condition causes melting of or heat damage to any synthetic resin-cased component on the circuit board (line card) with which the resistor network is closely associated, or causes the circuit board to burn. There are arc-minimizing and environmentally protective coatings overlying the films, and these cooperate with other components, factors and relationships in making any arcing insignificant.

Termination traces are screen-printed onto the substrate, and connect through pins to the circuit board. A relay (thermistor controlled relay circuit) is provided on the board, being connected to such pins and thus to such thermistor. The relay and thermistor are such that when the substrate of the present balancing resistor network increases in temperature to near that which would result from a second-level condition, the relay is operated to shut down the overload current flow through the board and thus through the balancing resistor network which is on the board. Cooling of the resistor network then occurs, and the relay is such that the thermistor-relay combination automatically causes current to flow again.

The substrate is caused to be small, but sufficient resistive film is deposited on both sides of the substrate that lightning transients, a first-level condition, will not harm the resistor. Because of the thermistor-relay combination, the smallness of the substrate does not result in harm when the overheating from second-level conditions starts to exist.

The termination traces on the substrate connect the resistive films to each other and, very importantly, are such as to take advantage of substantially instantaneous reliable fracture of the substrate, so that there is substantially instantaneous breakage of the electric circuits when a third-level adverse condition occurs. The breakage is so fast that small wires in the telephone system, both on and far remote from the board, do not melt, burn or become damaged, and so that there is no fire danger.

Two of the termination traces referred to in the preceding paragraph are near the top edge of the substrate on both substrate surfaces, generally parallel to such top edge. Two other of the termination traces are spaced upwardly from the bottom edge of the substrate on both substrate surfaces, generally parallel to such bottom edge. The respective resistive films extend between the termination traces mentioned above in this paragraph, and current flows vertically therethrough. There are no separate termination traces below the top edge of the substrate and spaced above the upper regions of the resistive films. However, there are end termination traces, connecting to the upper traces, and that are located between the resistive films and the end edges of the substrate, in spaced relationship from the resistive film ends. Occurrence of a third-level condition fractures the substrate at such locations as to substantially instantaneously break the termination traces at the substrate corners and/or ends, thus preventing the above-specified melting, burning, etc. The invention also encompasses resistor networks in which current flows horizontally through the resistive films.

Both of the substrate surfaces are devoid of significant flaws, score lines, etc., in order to maximize the strength of the substrate and reduce production costs.

BRIEF DESCRIPTION

FIG. 2 is a view showing the front side of the substrate, and the termination traces thereon;

FIG. 3 is a view corresponding to FIG. 2 and showing the resistive films applied to the front of the substrate;

FIG. 4 is a view corresponding to FIG. 3 and showing a thermistor film applied to the front of the substrate;

FIG. 5 is a view corresponding to FIG. 4 and showing an overglaze of arc-minimizing and environmentally protective material, on the front of the substrate;

FIG. 6 is a view of the back of the substrate, and the termination traces thereon;

Figure 1:
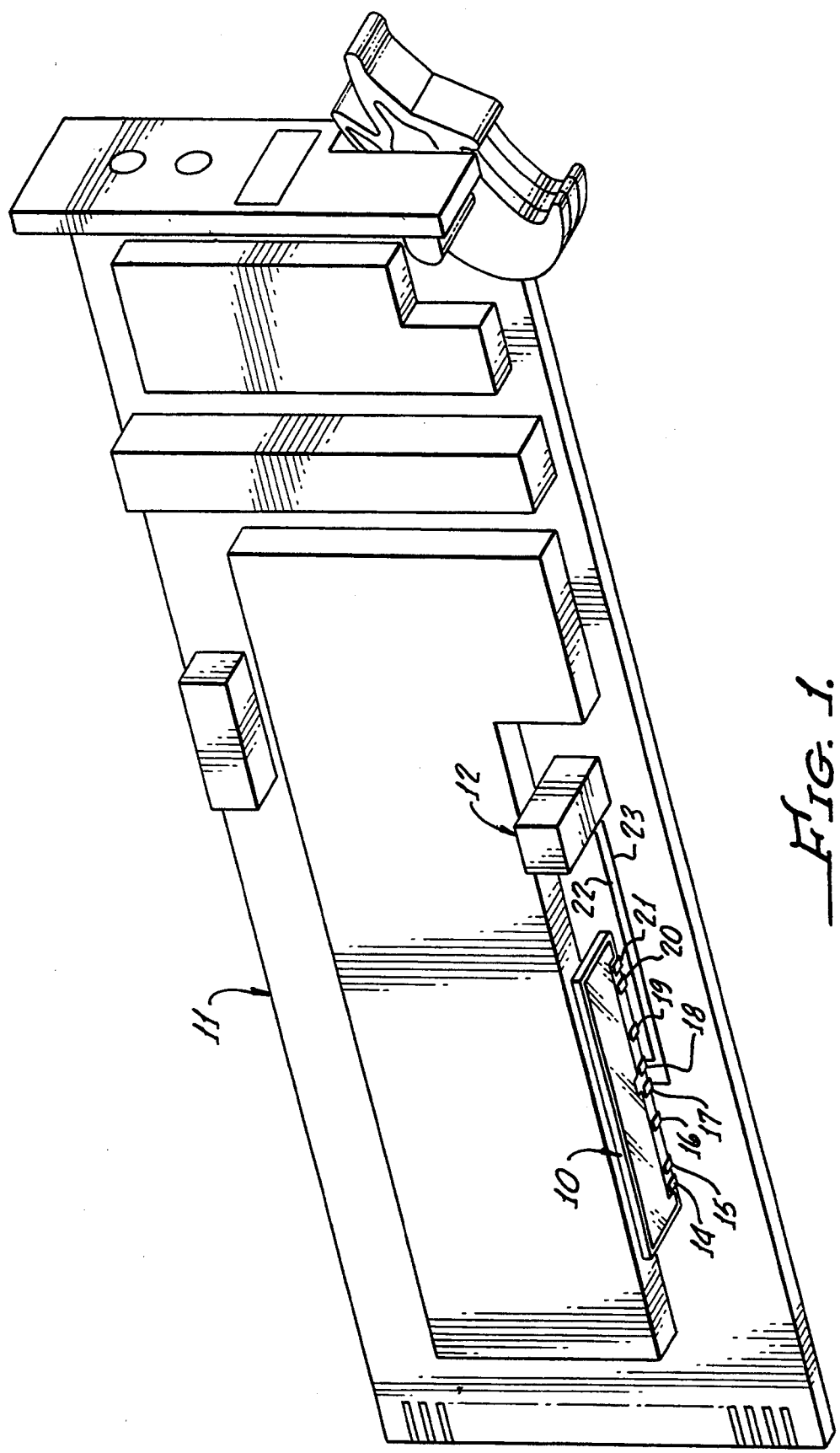
FIG. 1 is a representation of a telephone line card having numerous components that are represented schematically by large blocks, and also having mounted thereon one of the present resistor-relay combinations.

FIG. 7 corresponds to FIG. 6 and further shows the resistive films on the back; and FIG. 8 is a view corresponding to FIG. 7 and showing the arc-minimizing and environmentally protective coating on the back, and also showing the pins.

DETAILED DESCRIPTION OF THE PREFERRED EMBODIMENT

Referring to FIG. 1, a balancing resistor network for telephone circuits, constructed in accordance with the present invention, is indicated at 10—being shown as part of a telephone circuit board (line card) 11 which is of conventional construction. A typical physical size of the resistor network 10 is 1.6 inches long and 0.46 inch high (mounted height). This size is for a network consisting of two balanced (matched) 100-ohm resistors. The indicated small resistor network satisfies all three of the above-stated levels of adverse conditions, when used in combination with a relay, and automatically resets so that the board 11 resumes functioning after a second-level adverse condition ceases to exist.

The substrate is caused to have a different surface area for each size (ohmic value) or size range of resistors, the area being caused to be just sufficient that lightning transients will not cause damage to the resistors.

(It is to be understood that only one channel is schematically represented in FIG. 1, and that there are (typically) two to four channels each having its own resistor network and relay.)

Eight termination pins 14-21 are provided at the lower edge of resistor 10, and are respectively inserted into and connected to plated holes in the circuit board. Conductors 22,23 form part of the circuit board 11 and extend respectively from central pins 17,18 to terminals on relay 12.

Referring next to FIG. 2, the telephone resistor and thermistor network (numbered 10 in FIGS. 1, 5 and 8) includes a thin substrate 25 that is elongate and rectangular as illustrated. It has parallel front and back surfaces that are continuous and uninterrupted, the surfaces being sufficiently far from each other that the substrate will have much strength and also the ability to conduct substantial heat. For example, the thickness of the substrate is 0.025-0.040 inch. The substrate is a brittle ceramic, such as aluminum oxide, having a desirable moderate (not low) thermal coefficient of expansion.

Substrate 25 has top and bottom edges 26,27 that are parallel to each other, and end edges 28,29 that are parallel to each other. As shown in FIG. 2, there are on the front surface of the substrate top elongate termination traces (metalizations) 31,31a that are mirror images of each other (all mirror images being about the vertical center line of substrate 25). Traces 31,31a are parallel to top edge 26 and spaced a short distance therefrom. These traces respectively connect to end traces 32,32a that are parallel to end edges 28,29 and spaced a short distance therefrom. The indicated connections are in the upper corners of substrate 25. End traces 32,32a are mirror images of each other.

Lower traces 33,33a are provided in parallel relationship to and respectively directly below top traces 31,31a, and also in spaced parallel relationship to bottom edge 27. The spacing of lower traces 33,33a above bottom edge 27 is substantial, for example about one-third of the distance between the top and bottom edges. Lower traces 33,33a are mirror images of each other.

Bottom traces are provided between the lower traces 33,33a and bottom edge 27; these are numbered 34,34a. They respectively connect to end traces 32,32a, at the bottom corners of the substrate. The bottom traces are spaced a short distance from bottom edge 27 and are parallel to it. The bottom traces respectively connect to double pads 36,37 and 36a,37a.

Lower traces 33,33a respectively overlap the bottom traces and associated pads. The lower traces terminate at their outer ends adjacent spaces 38,38a, such spaces being between such outer ends and the vertical traces 32,32a. Near the inner ends of lower traces 33,33a are associated vertical traces and pads 39,39a. These connect to the lower traces 33,33a, respectively.

The inner ends of top and lower traces 31,31a and 33,33a are mirror images of each other and are spaced apart a relatively large distance to form a large central gap G in the substrate 25 (FIGS. 2 and 3). In such gap G, and spaced from the inner ends of the top and lower traces, are inner vertical traces 41,41a the lower ends of which connect respectively to pads 42,42a at the lower substrate edge. The traces 41,41a are spaced from each other a substantial distance and are preferably parallel as illustrated. Traces 41,41a are mirror images of each other as are pads 42,42a.

All of the above-specified traces and pads (metalizations) are formed of, for example, palladium silver, and are screen-printed onto the front surface of substrate 25 and then fired in a conveyor furnace. All traces, of course, have very low resistance, for example 20 milliohms per square.

Referring next to FIG. 3, identical continuous thick-film resistive films 44,44a are screen-printed onto the front surface of substrate 25 between top traces 31,31a and lower traces 33,33a, respectively. Each film 44,44a is rectangular, and each has its upper and lower edges located in overlapping relationship to the associated traces. After the films 44,44a are screen-printed onto the substrate, the substrate is fired in a conveyor furnace. Each resistive film described in this specification is an electrically conductive complex metal oxide in a glass matrix.

The thick-film deposits (films) are relatively thin, being deposited (screen-printed) using stainless steel screens of 250 mesh to 105 mesh (200 mesh being most common). The resistive film thickness ranges from 0.0004 inch to 0.0010 inch (fired thickness).

Referring to FIG. 4, there is screen-printed into the large gap G at the center of the front surface of substrate 25 a thermistor film 45. Film 45 is rectangular, and the vertical edges thereof overlap inner vertical traces 41,41a. The thermistor film 45 is, for example, EMCA part number 4995. The thermistor material may be a negative temperature coefficient material in the range of $-0.1\%/°C.$ to $-5\%/°C.$ (ideally $-1\%/°C.$ to $-3\%/°C.$), or the thermistor material may be a positive temperature coefficient material $+0.1\%/°C.$ to $+5\%/°C.$ (ideally $+1\%/°C.$ to $+3\%/°C.$). After application of the thermistor film, the part is fired.

Referring to FIG. 5, there is applied over all of the traces and all of the films, excepting the pads, a layer of arc-minimizing and environmentally protective substance, namely glass. Thus, an overglaze 46 is applied by screen-printing. After such application, the part is fired in order to fuse the overglaze. The relationships between the overglaze and the resistive films and the thermistor film are such that application and firing of the overglaze do not harm the films.

Referring next to FIGS. 6-8, the back surface of substrate 25 is shown. Except as specifically described below, everything is the same on the back surface of substrate 25 as on the front surface thereof.

There is no thermistor 45 on the back surface and thus no associated traces although there are blind pads for use in mounting of central pins 17,18. The gap at the center of the substrate, at the back thereof, is preferably somewhat smaller than gap G shown in FIGS. 2 and 3, being labelled g. The central gap being smaller, the resistive films are preferably somewhat longer than are the resistive films on the front surface.

The traces and pads on the right side of the substrate (as viewed in FIG. 6), that is to say to the right of the vertical center line of substrate 25 as viewed in FIG. 6, are directly opposite and registered with the traces and pads shown at the left in FIG. 2. The traces and pads at the right in FIG. 6 are given the same reference numerals as those at the left in FIG. 2, except followed in each instance by the letter "b".

Similarly, the traces and pads at the left side of the substrate as viewed in FIG. 6 are registered with and correspond to the traces and pads shown at the right in FIG. 2. In FIG. 6, in each instance, such left traces and pads are given the same reference numerals as those at the right in FIG. 2 except followed in each instance by the letter "c" instead of "a".

Referring next to FIG. 7, resistive films 44b,44c are respectively provided directly opposite the films 44,44a shown in FIG. 3. As illustrated, the films 44b,44c extend somewhat further toward the center of the substrate 25 in that the gap g is smaller than gap G of FIGS. 2 and 3. The outer ends of the resistive films 44b,44c (FIG. 7) are respectively registered with the outer ends of the resistive films 44,44a shown in FIG. 3.

Films 44b,44c are identical to each other and are substantially identical to films 44,44a.

An arc-minimizing and environmentally protective layer is screen-printed over all of the back-side traces and resistive films, as shown in FIG. 8, and substantially corresponds to the layer shown at 46 in FIG. 5. This is glass as stated above relative to FIG. 5. Unlike the overglaze 46 shown in FIG. 5, that shown in FIG. 8 is in two sections 46a that are spaced apart at 47. However, one continuous overglaze may be provided on the back surface of the substrate, the same as on the front.

All of the traces, films and protective arc-minimizing layers are deposited by screen-printing. In each instance, the application is followed by firing in a conveyor furnace.

The above-indicated pins 14-21 (FIGS. 1 and 8) are provided on the various pads and then secured in place and electrically connected by being dipped in solder. (A showing of the pins 14-21 is omitted in FIG. 5, but it is to be understood that they are present.) Each pin has jaws that grip opposite sides of the substrate 25 adjacent lower edge 27 thereof, that is to say grip the registered pads on such opposite sides. Thus, outer pin 14 grips and is electrically and physically connected to pads 36,36b; outer pin 15 to pads 37,37b; intermediate pin 16 to pads 39,39b; central pin 17 to pads 42,42b; central pin 18 to pads 42a,42c; intermediate pin 19 to pads 39a,39c; outer pin 20 to pads 37a,37c; and outer pin 21 to pads 36a,36c.

The described traces and pins connect resistive films 44 and 44b in parallel relationship with each other, and they connect resistive films 44a and 44c in parallel relationship with each other. Central pins 17 and 18 connect the thermistor film 45 to conductors 22,23 on the line card 11 of FIG. 1. Thus, the thermistor 45 is connected to relay 12. Relay 12, in turn, is connected to conductors (not shown) on the circuit board that when open-circuited terminate the flow of current to the entire channel with which resistor 10 is associated, and thus to the entire resistor 10.

The two resistive films on one side of the vertical center line of substrate 25 form one resistor, and the two resistive films on the other side of such vertical center line (other half of the substrate) form another resistor. Thus, the parallel connected films 44,44b form one resistor whereas the parallel-connected films 44a,44c form another resistor. Such one resistor and such other resistor are balanced relative to each other, that is to say are equal or substantially equal to each other in resistance value.

Further Disclosure of Certain Important Relationships

One important relationship is that the resistive films, the traces, and the substrate are such that application of a high-voltage overload to one or both of the resistors will cause substantially instantaneous breakage of the substrate and traces with consequent immediate cessation of current flow through the balancing resistor networks (or through only one of the balancing resistor networks if the overload is applied only to such one). The overload is typically caused by falling of a power line, etc., onto the telephone circuit, or by other contact between a power line and a telephone circuit. Typical overload voltages are 600 volts, 277 volts and 120 volts.

Another important relationship is that there are end traces on opposite sides of the substrate at the ends thereof, in spaced-parallel relationship to the vertical ends of the resistive films. When high overload voltages are applied to the resistive films 44,44a,44b and 44c there is a sudden heating—from both sides—of substrate 25 at the regions sandwiched between the resistive films. The edges 28,29, on the other hand, are cool. Accordingly, there is thermal shock due to the large temperature differences and related expansion differences between the substrate regions underlying the resistive films and the substrate regions at the ends (end edges) of the substrate. Such thermal shock causes fracturing of the end regions and/or corner regions of the substrate, with consequent immediate breakage of traces 32,32a,32b and 32c. There is no breakage at the central regions of the substrate.

Another important relationship is such that the application of high voltages to the resistive films does not cause substantial arcing to the thermistor 45 (FIG. 4). Arcing is prevented because the thermistor 45 is spaced substantial distances from the films 44,44a that are on the same side of substrate 25, being sufficiently far therefrom that arcing will not normally occur. Furthermore, the overglaze 46 operates in combination with the distances to effectively minimize such arcing.

Another important relationship is that the thermistor 45 is not spaced excessively far from the resistive films 44,44a,44b and 44c. Instead, the thermistor is sufficiently close to the films that there is conduction of sufficient heat through the substrate 25 to effect operation of the thermistor 45, which acts as a sensor for relay 12.

Another important relationship is that the size of the substrate is correlated to the resistance values of the resistor pair, being substantially as small as permitted by having resistive films on both sides (surfaces) of the substrate.

Another important relationship is that each resistor in the balanced resistor pair is relatively low in value. Stated more definitely, each resistor (parallel-connected resistive films on each side of the vertical center line of the substrate) has a resistance in the range of about 25 ohms to about 300 ohms.

Another important relationship is that both of the surfaces of substrate 25 are devoid of flaws, grooves, scores, etc. This maximizes the strength of the resistor for a particular thickness of substrate, and reduces production costs.

A further important relationship is that there is no trace (or traces) spaced upwardly above the top edges of the resistive films 44,44a,44b,44c. The upper region of a substrate is therefor very effectively and efficiently used as a support for the resistive films, which reduces substrate size. On the other hand, the lower traces 33,33a,33b and 33c are spaced substantial distances upwardly from the bottom edge 27 of the substrate, in order to provide (in combination with the overglaze) isolation relative to the termination pins and pads.

A further important relationship is that the resistive films are each substantially continuous, by which it is meant that substantially all of the substrate area beneath each resistive film—between opposed traces—has resistive film deposited thereon. This relationship creates greater stability of resistance value under lightning transient conditions.

Operation

Let it be assumed that one of the resistor networks 10 constructed as set forth above has been mounted on the line card or circuit board 11 as shown in FIG. 1, in one of the channels thereof. For example, the particular resistor 10 may be the one having the physical size stated above (namely, 1.6 inch long by 0.46 inch high), with each resistor having a value of 100 ohms. Stated otherwise, in the example, the parallel-connected films on one side of the vertical center line of the substrate have a combined value of 100 ohms, and the parallel-connected films on the other side of the vertical center line of the substrate have a combined value of 100 ohms.

Let it next be assumed that there occurs a certain kind of first-level condition, namely a lightning transient. Because the resistive films are on both sides of the substrate, and despite the small size of the substrate, the resistive films are not damaged. In other words, this transient condition is survivable. Current flow through the resistor and through the circuit board is not interrupted or discontinued, and nothing is harmed.

Another type of first-level condition is where a technician has created faulty wiring, but the faulty wiring happens to be of a type that does not result in generation of sufficient heat in the resistor network to operate thermistor 45 in a way that operates the relay 12 and thus discontinues or interrupts current flow. Another type of first-level condition is where a technician has created faulty wiring of a type such that sufficient heat is generated to effect operation of the relay. With such a first-level condition, the thermistor-relay combination makes it survivable in that the relay will automatically reset. The same occurs relative to a second-level condition, as next described.

Let it next be assumed that there occurs a second-level condition. For example, let it be assumed that a particular type of faulty wiring is created by a technician, and that the particular type is one which tends to cause excessive heating of the resistor network and/or of components on circuit board (line card) 11. For example, the heating may be such as to tend to effect melting of, burning of, or other harm to synthetic resin-cased components on the circuit board or to the circuit board itself. In such event, and before any damage occurs to any component, sufficient heat is conducted through substrate 25 from resistive films 44,44a,44b and 44c to thermistor film 45 that the resistance of the latter changes in such manner as to effect operation of relay 12 to open the circuit in the particular channel in which the resistor-relay pair 10,12 is mounted.

Because current flow through such channel has been interrupted, there is no current flowing in resistor 10 and it immediately starts to cool. When a predetermined desired temperature has been achieved, the thermistor film 45 has such a resistance that the associated relay 12 operates to close the circuit through the channel in which the resistor-relay pair 10,12 is mounted. In other words, the thermistor resets without human intervention. It is to be understood that a time-delay network may be built into the relay 12 to delay the time at which such resetting occurs. As another option, the relay may have a zero crossing circuit to minimize arcing at the relay contacts.

Let it next be assumed that a third-level condition occurs. For example, a 600-volt power line may contact the telephone line of the channel with which the resistor-relay pair 10,12 is associated. There is then a sudden overload current present in the resistive films 44,44a,44b and 44c, which causes very rapid heating of the substrate material sandwiched between the two films of each resistor. On the other hand, the substrate material at the ends of the substrate is not thus rapidly heated but instead remains (in comparison to the temperatures present between the films in each film pair) relatively cool. There is thus a thermal shock at each end of the substrate, and this causes breaking at the substrate at the corners and/or ends thereof. Because traces 32,32a,32b and 32c are at places where the substrate is broken, these traces are immediately interrupted so that the current flow through resistor 10, and thus the circuit board, stops. This occurs in a very small fraction of a second.

Despite the condition stated in the preceding paragraph, there is minimal chance of arcing between any resistive film 44,44a,44b and 44c and the thermistor film 45 or associated traces 41,41a. This is because of the above-described spacing between the last-mentioned elements and the resistive films.

The overglaze 46 performs important functions of aiding in minimizing arcing. Any arcing stops so very fast that small wires in the telephone system do not melt, become damaged, or burn.

There has thus been described a resistor and resistor combination, with a relay, particularly adapted and effective for small-size substrates, and for those companies (and applications) where automatic resetting after cessation of a second-level adverse condition is desired. The resistor is small, strong, environmentally protected, etc. It and the associated relay do the desired job reliably relative to all three levels of adverse conditions, and reset automatically after a second-level adverse condition (and after a circuit-interrupting type of first-level condition) has existed.

The foregoing detailed description is to be clearly understood as given by way of illustration and example only, the spirit and scope of this invention being limited solely by the appended claims.

What is claimed is:

1. A telephone balancing and cut-off resistor network and combination, which comprises:
   a thin substrate having front and back surfaces parallel to each other,
   said front surface having left and right sides,
   said back surface having left and right sides, first and second thick-film resistive films screen-printed onto said front surface of said substrate,
   third and fourth thick-film resistive films screen-printed onto said back surface of said substrate,
   said first and second resistive films being respectively on said left and right sides of said front surface and being separated from each other by a gap,
   said third and fourth resistive films being respectively on said left and right sides of said back surface and being separated from each other,
   said first and third resistive films being opposite each other, and
   said second and fourth resistive films being opposite each other,
   said first and third resistive films being electrically connected with each other and forming one resistor,
   said second and fourth resistive films being electrically connected with each other and forming another resistor,
   said one resistor and said other resistor having such resistances as to be balanced with each other,
   a thermistor film screen-printed onto said front surface of said substrate in said gap,
   first termination means to connect said one resistor and said other resistor to a telephone circuit board,
   second termination means to connect said thermistor film to said board,
   a relay mounted on said board and electrically connected to said second termination means,
   said relay and said thermistor film and said resistive films being so related to each other that said thermistor film will cause operation of said relay when said substrate begins to be heated excessively in response to a misconnection of a type that markedly increases current flow,
   said substrate and said resistive films having such physical size that said films will not be damaged by lightning transients, and
   environmentally protective and arc-minimizing coating means provided over said films.

2. The invention as claimed in claim 1, in which said first termination means for said one resistor and said other resistor includes termination traces on end regions of said substrate surfaces and spaced from said resistive films, said traces being adapted to break substantially instantaneously when said end regions fracture in response to a high voltage applied to at least one of said balanced resistors, said thermistor film being so located as not to arc to said resistive films when said high voltage is applied.

3. The invention as claimed in claim 1, in which said substrate is elongate and each of said resistive films is rectangular in configuration.

4. The invention as claimed in claim 1, in which each of said resistive films is continuous.

5. The invention as claimed in claim 1, in which said thermistor film is spaced from said resistive films sufficiently far, and said coating means is such, that there is minimal chance of arcing between said resistive films and said thermistor film when a high-voltage overload is applied to said resistive films.

6. The invention as claimed in claim 1, in which the physical size of said substrate is only sufficiently large that said films will not be damaged by lightning transients.

7. The invention as claimed in claim 1, in which said resistive films and said substrate are constructed and related to cause fracture of said substrate, and thus breakage of circuits through said resistors, when high voltage is applied to said first termination means.

8. A telephone balancing resistor network, which comprises:
   an elongate rectangular ceramic substrate having front and back surfaces parallel to each other and close to each other,
   said substrate having top and bottom edges parallel to each other and left and right end edges parallel to each other, left and right elongate upper metalization traces screen-printed onto said front surface in aligned relationship relative to each other, said left and right elongate upper metalization traces being respectively on the left and right sides of a vertical center line of said substrate, left and right elongate lower metalization traces screen-printed onto said front surface in aligned relationship relative to each other, said left and right lower traces being respectively on the left and right sides of said vertical center line, said left and right lower traces being respectively spaced relatively large distances below said left and right upper traces, and being respectively parallel to said left and right upper traces, left and right thick-film resistive films screen-printed onto said front surface, said left resistive film having a left end, and said right resistive film having a right end, said left resistive film extending between said left upper and left lower traces, said right resistive film extending between said right upper and right lower traces, said resistive films being spaced from each other to form a large gap in the central region of said front surface, left and right end metalization traces screen-printed onto said front surface, said left end trace being connected to said left upper trace and being located between said left end edge of said substrate and said left end of said left resistive film, said right end trace being connected to said right upper trace and being located between said right end edge of said substrate and said right end of said right resistive film, left and right bottom metalization traces screen-printed onto said front surface near said bottom edge of said substrate, in respective spaced relationship below said lower metalization traces, said left and right bottom traces being respectively connected to said left end trace and said right end trace, left and right termination pin means at said bottom edge and being respectively connected to said left and right bottom traces, first and second intermediate pin means at said bottom edge and respectively connected to said lower metalization traces, spaced-apart central metalization traces screen-printed in said large gap, first and second central pin means at said lower edge and respectively connected to said central traces, a thermistor film screen-printed in said large gap and extending between said central traces, an environmentally protective and arc-minimizing film provided over said traces and said films, and metalization traces and associated resistive films provided on said back surface of said substrate and opposite said respective traces and associated resistive films on said front surface, so that there are two resistive films on each side of said vertical center line of said substrate, the two resistive films on each side of said vertical center line of said substrate being connected in parallel with each other to form one resistor and one other resistor, said one resistor and said one other resistor being on opposite sides of said center line and being balanced relative to each other.

9. The invention as claimed in claim 8, in which said upper traces are relatively close to and parallel to said top edge of said substrate, and in which there are no traces between said top edge and said upper traces.

10. The invention as claimed in claim 8, in which said films and traces on the left and right sides of said substrate are respectively mirror images of each other.

11. The invention as claimed in claim 8, in which said resistive films are continuous, and in which said front and back surfaces of said substrate are continuous and free from substantial flaws and depressions and grooves.

12. A telephone balancing resistor network, which comprises:

an elongate rectangular ceramic substrate having front and back surfaces parallel to each other and close to each other, said substrate having top and bottom edges parallel to each other and left and right end edges parallel to each other, left and right elongate metalization traces screen-printed onto said front surface, said left and right traces being respectively on the left and right sides of a vertical center line of said substrate, left and right thick-film resistive films screen-printed onto said front surface, on the left and right sides of said vertical center line, said left resistive film extending to said left trace, said left resistive film having a left end edge, said right resistive film extending to said right trace, said right resistive film having a right end edge, said resistive films being spaced from each other to form a large gap in the central region of said front surface, left and right end metalization traces screen-printed onto said front surface, said left end trace being connected to said left trace and being located between said left end edge of said substrate and said left end edge of said left resistive film, said right end trace being connected to said right trace and being located between said right end edge of said substrate and said right end edge of said right resistive film, left and right bottom metalization traces screen-printed onto said front surface near said bottom edge of said substrate, in respective spaced relationship below said left and right resistive films, said left and right bottom traces being respectively connected to said left end trace and said right end trace, left and right termination pin means at said bottom edge and being respectively connected to said left and right bottom traces, first and second intermediate pin means at said lower edge and respectively connected to said left and right resistive films at regions thereof remote from said left and right traces, spaced-apart central metalization traces screen-printed in said large gap, first and second central pin means at said bottom edge and respectively connected to said central traces, a thermistor film screen-printed in said large gap and extending between said central traces, an environmentally protective and arc-minimizing film provided over said traces and said films, left and right thick-film resistive films screen printed onto said back surface of said substrate on opposite sides of said vertical center line and connected to said resistive films on said front surface of said substrate, and an environmentally protective and arc-minimizing film provided over said resistive films on said back surface.

* * * * *